Inventors:
Joseph C. Sofianek
August L. Streater
by William Freedman
Attorney.

Inventors:
Joseph C. Sofianek,
August L. Streater,
by William Freedman
Attorney.

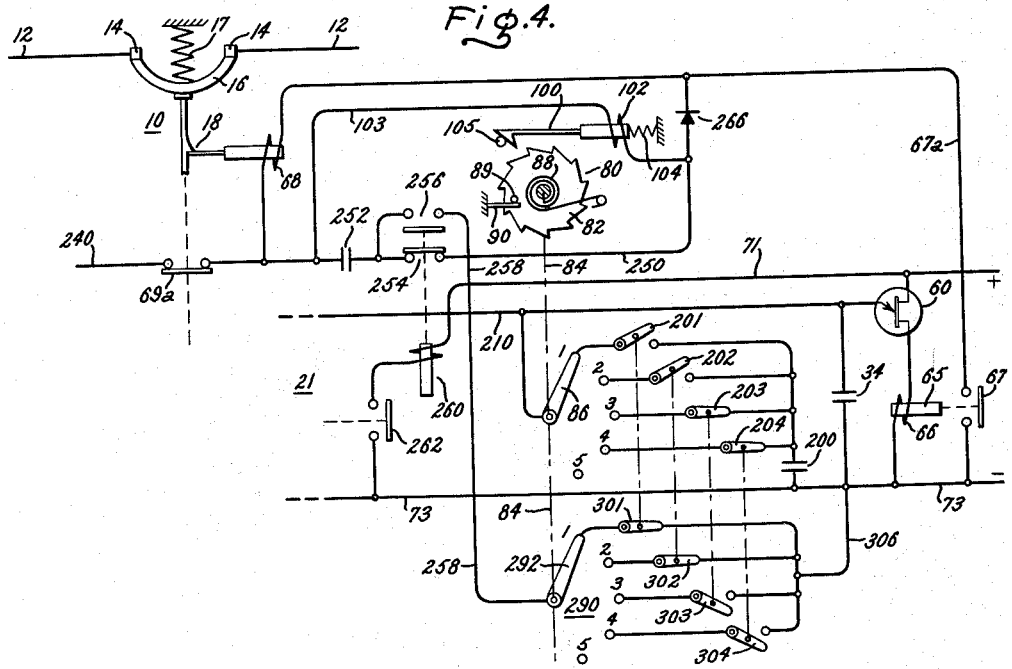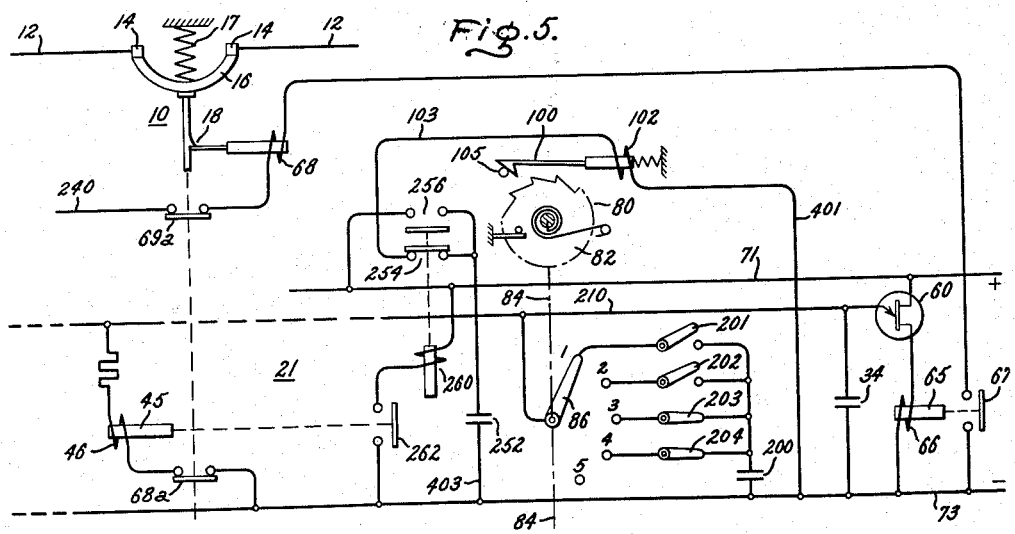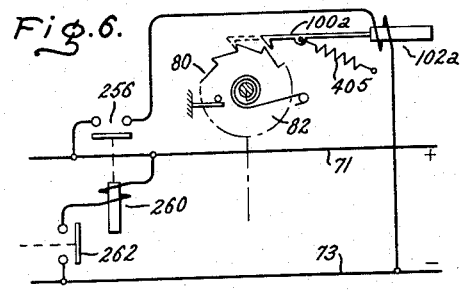

United States Patent Office 3,114,079
Patented Dec. 10, 1963

3,114,079
AUTOMATIC CIRCUIT RECLOSER WITH
IMPROVED COORDINATING ABILITY
Joseph C. Sofianek and August L. Streater, both of Broomall, Pa., assignors to General Electric Company, a corporation of New York
Filed May 31, 1961, Ser. No. 113,945
22 Claims. (Cl. 317—22)

This invention relates to an automatic circuit recloser and, more particularly, relates to means for improving the ability of a circuit recloser to coordinate its own operation with that of one or more other reclosers connected in a power system therewith. The invention is also concerned with a method for effecting this improved coordinating ability.

The usual electric power system may be thought of as comprising a number of system portions interconnected by circuit interrupters disposed between adjacent portions. These circuit interrupters are controlled by fault-sensitive means which must be capable of sensing the occurrence of a fault in any of the system portions and of initiating operation of those particular circuit interrupters which are located to effect isolation of the faulted system portion from the remainder of the system. It is a general objective in the art of circuit protection to open only the minimum number of circuit interrupters required to effect isolation of the fault so that a maximum amount of the system remains available for continued uninterrupted service.

Assuming that the system is one in which the circuit interrupters operate with inverse time-overcurrent characteristics, one way of accomplishing this objective is to coordinate the operation of the circuit interrupters in accordance with their opening times. More specifically, these opening times are so adjusted that the further a circuit interrupter is from the source of power, the shorter will be its opening time for a given overcurrent. Thus, if a fault occurs at some remote circuit location, the circuit interrupter closest to the fault will operate to isolate the fault before the circuit interrupters closer to the power source have had an opportunity to operate. Since the circuit interrupters that are located closer to the power source have remained closed, uninterrupted service can be maintained over the entire system portion except for that portion beyond the then open interrupter.

If the circuit interrupters in such a system are automatic reclosers of the type that have extra time delay introduced into their opening times after one or more opening operations in a series of closely successive operations, then a serious coordination problem arises. In this regard, assume that when the reclosers are all in their normal closed circuit condition, their opening time characteristics are so adjusted that the further the recloser is from the source of power the faster will be its opening time. Assume further that a fault develops at a remote point in the circuit and that in response to this fault the remote circuit recloser opens and recloses a sufficient number of times to introduce extra time delay into its next succeeding opening operation. Ordinarily, this added time delay will render the remote recloser slower in operation than some of the reclosers closer to the power source, and the result will be that instead of the remote recloser continuing to reopen, as desired, a recloser closer to the source will open. This will unnecessarily interrupt service over the entire portion of the system on the remote side of the closer recloser, thus undesirably interfering with service continuity over system portions which are still sound and unaffected by the fault.

An object of the present invention is to control the closer recloser of such a system in such a manner that its operation will still be properly coordinated with that of a remote recloser, even after the remote recloser has opened and reclosed a sufficient number of times to cause extra time delay to be introduced into its next succeeding opening operation.

Another object is to introduce this improved coordinating capability into the performance of an automatic recloser without affecting the ability of the recloser to respond quickly and in a properly coordinated manner prior to the instant at which extra time delay is introduced into the opening characteristics of the remote recloser.

In carrying out our invention in one form, we provide an automatic circuit recloser that includes means for opening the recloser in response to an overcurrent condition and means for automatically reclosing the recloser following an opening operation. The recloser further includes normally inactive time delay means operable when active to delay an opening operation of the recloser for a controlled period following initiation of an overcurrent condition. Sequencing means responsive to operations of the recloser is provided for rendering said time delay means active after at least one recloser opening operation for delaying the next succeeding opening operation in a series of closely successive opening operations. In addition to being responsive to actual operations of the recloser, the sequencing means is also responsive to the termination of overcurrent conditions of insufficient duration to cause opening of the recloser. These insufficient duration overcurrent conditions are sensed by control means which causes the sequencing means to render the time delay means active during the next overcurrent condition closely following interruption of the predetermined number of these insufficient duration overcurrent conditions.

Still another object is to construct the recloser in such a manner that the control means for operating the sequencing means in response to overcurrents of insufficient duration does not produce unnecessary lockout of the recloser and does not interfere with the recloser's ability to reset to its normal-at-rest condition after the faulted portion of the system is isolated by some means other than the recloser itself.

Another object is to assure that the sequencing means is operated only once for each overcurrent, whether the overcurrent is or is not of sufficient duration to cause opening of the recloser.

For a better understanding of our invention, reference may be had to the following description taken in conjunction with the accompanying drawings, wherein:

FIG. 4 is a schematic view illustrating a modified form of our invention.

FIG. 5 is a schematic view illustrating another modified form of our invention.

FIG. 6 is a schematic view illustrating still another embodiment of our invention.

Figure 1:
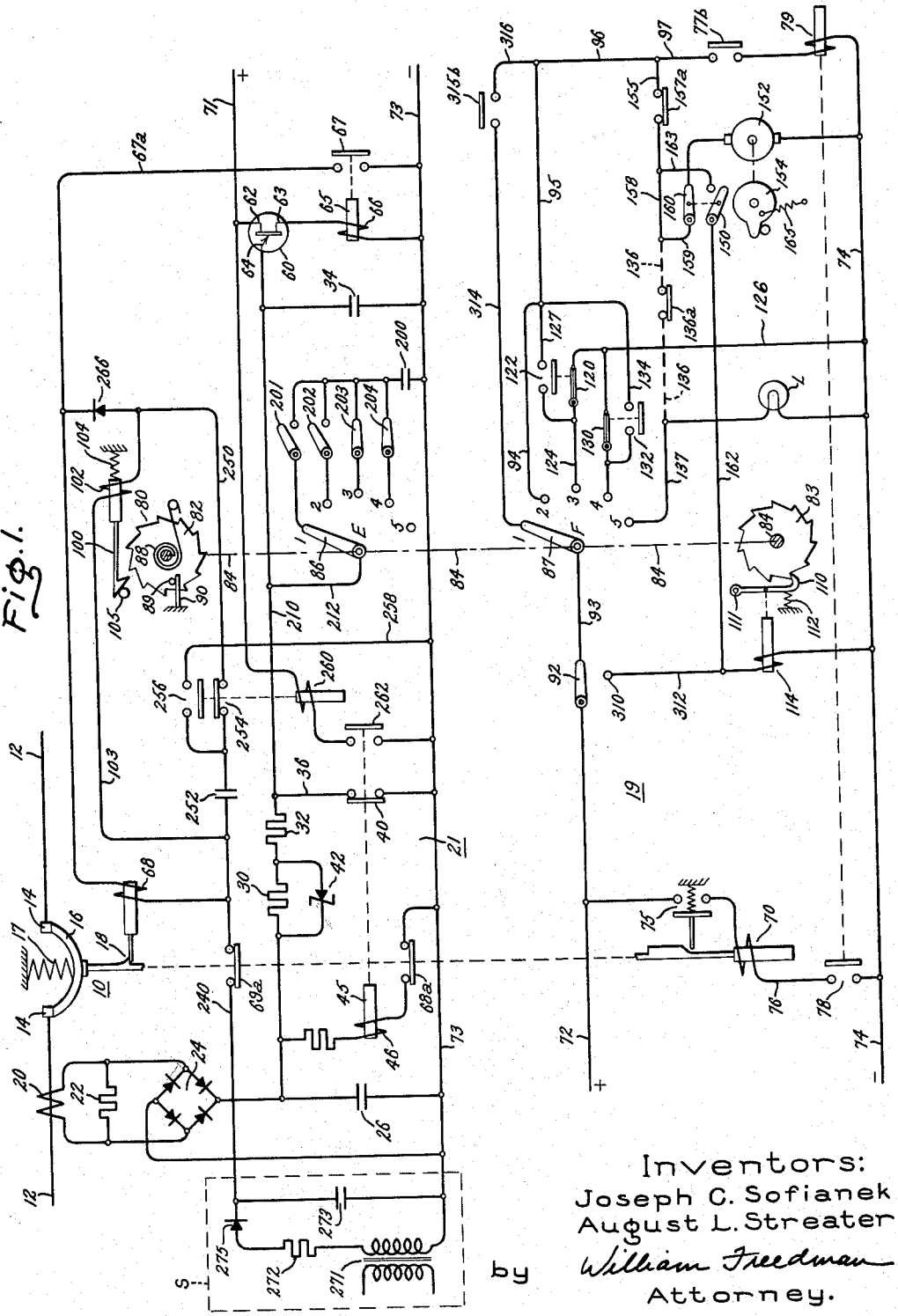
FIG. 1 is a schematic diagram of a circuit recloser embodying one form of our invention.

Referring now to FIG. 1, there is shown an automatic circuit recloser 10 for controlling the flow of current through a power line 12, which may be one phase of a polyphase A.C. power system. The circuit recloser comprises a set of stationary contacts 14 and a movable bridging contact 16 biased in a direction away from the stationary contacts by a suitable compression spring 17. The recloser 10 is normally maintained in its closed position of the drawing by a suitable trip latch 18 that can be released in a manner soon to be described to permit the spring 17 to separate the contacts 16 and 14 and thereby interrupt the flow of current through power line 12.

Ordinarily, after an opening operation, the recloser 10 is automatically reclosed so that service can be restored over the power line 12 in the event that the condition responsible for opening of the recloser is no longer present. These reclosing operations are controlled by a portion of the recloser generally designated 19 in FIG. 1.

Opening operations of the recloser 10 are controlled by a portion of the recloser generally designated 21. This opening control portion 21 is similar in many respects to the circuit breaker arrangement disclosed in copending application S.N. 74,325—Casey and Sofianek, filed December 7, 1960, and assigned to the assignee of the present invention. Certain features of this tripping circuit are disclosed in greater detail and are claimed in the aforementioned Casey and Sofianek application, and reference may be had thereto if more information is desired as to these features.

Generally speaking, the opening control portion 21 is designed to trip the recloser open in response to overcurrents in the power line 12 above a predetermined pickup value. Such tripping will occur with a time delay that varies in duration inversely with respect to the magnitude of the overcurrent. The term "overcurrent" as used in this application is intended to comprehend not only abnormally high currents flowing in any phase of a polyphase system but also unbalanced currents in excess of a predetermined value. For example, if the currents flowing in the different phases of a polyphase A.C. power system become unbalanced by more than a predetermined amount, an overcurrent may be considered present. In this latter case, the overcurrent may be thought of as being an excess of zero-phase-sequence current. Conventional ground-fault-sensitive networks are available for providing an output signal proportional to the magnitude of this unbalanced or zero-phase-sequence current. To simplify the present description, however, we have shown reclosers that are intended to operate in response to abnormally high phase currents in the power line 12.

For sensing the magnitude of the current flowing in power line 12, a current transformer secondary winding 20 magnetically coupled to the power line 12 is provided. Connected across the terminals of the current transformer winding 20 is a suitable resistor 22, across which is developed an alternating voltage that is proportional to the current flowing through the current transformer winding 20, and, hence, through the power line 12. The current transformer 20 is so designed that it will not saturate at any currents within the current range which circuit breaker 10 is intended to operate, so that for all such currents the proportional relationship of line current to the voltage developed across resistor 22 will be essentially maintained.

The voltage developed across the resistor 22 is rectified by a conventional rectifying bridge 24 connected across the resistor 22, and the full wave output from this bridge is smoothed by a smoothing capacitor 26 connected across the output terminals of the rectifying bridge. Accordingly, a relatively smooth unidirectional voltage, hereinafter termed the signal voltage, is developed across the terminals of the capacitor 26. This signal voltage is also essentially proportional to the magnitude of the current flowing through power line 12.

For developing a voltage that builds up at a rate that varies directly with respect to the magnitude of the signal voltage once the signal voltage exceeds a predetermined value, a suitable timing circuit connected across the terminals of smoothing capacitor 26 is provided. This timing circuit comprises a plurality of resistors 30 and 32 and a timing capacitor 34, all connected in series circuit relationship when the timing circuit is active. Normally, the timing circuit is rendered inactive by a low impedance discharge circuit 36 shunting the timing capacitor 34 and preventing a significant charge from being built up across the capacitor. The timing circuit is rendered active only when a set of contacts 40, connected in the discharge circuit 36, are opened to interrupt the discharge circuit. This is done in a manner soon to be explained.

Assuming that the timing circuit has been rendered active by opening of contacts 40, then the R-C time constant for the timing circuit at relatively low values of signal voltage is the sum of the resistances of resistors 30 and 32 times the capacitance of capacitor 34. This constant is preferably such that output voltage builds up across the timing capacitor 34 at a rate generally proportional to the magnitude of the overcurrent. At higher values of signal voltage, the voltage drop across the resistor 30 is limited to a predetermined fixed value by a Zener diode 42 of a conventional design connected in shunt with the resistor 30 and in series with the resistor 32. In a conventional manner, the Zener diode 42 breaks down at a predetermined voltage and limits the voltage drop across its terminals to essentially this value of voltage. This breakdown of the Zener diode at the higher values of signal voltage reduces the effective resistance in the timing circuit and thus lowers the R-C time constant of the circuit. The resistors of the timing circuit are preferably of such a size that under these high signal voltage conditions (when the Zener diode is regulating the voltage drop across resistor 30), the output voltage builds up across capacitor 34 to a preselected critical level (soon to be described) in a period of time that is approximately inversely proportional to the square of the current in power line 12. The use of a Zener diode in this manner for varying the R-C time constant of the timing circuit forms no part of our own invention and is disclosed and claimed in application Serial Number 138,476, Dewey, filed September 15, 1961 and assigned to the assignee of the present invention.

For rendering the timing circuit active when the current in power line 12 exceeds a predetermined value, which is referred to hereinafter as the pickup rating of the recloser, a gating relay 45 having an operating coil 46 connected across the terminals of the smoothing capacitor 26 is provided. This gating relay includes the aforementioned normally closed contacts 40 that are connected in the discharge circuit 36 around the timing capacitor 34. When the signal voltage developed across smoothing capacitor 26 exceeds a predetermined value (corresponding in magnitude to the rated pickup current of the recloser), the coil 46 of the relay becomes sufficiently energized to cause the relay to operate and open its contacts 40. This removes the discharge circuit 36 from around the timing capacitor 34 and thus allows the timing capacitor to begin its timing function, i.e., renders the timing circuit active. Since no significant charge was permitted to build up on the timing capacitor prior to operation of the gating relay, it will be apparent that inaccuracies in timing that could have resulted from such a premature charge have been eliminated.

For tripping the circuit breaker 10 when the output voltage from the timing circuit reaches a predetermined value, a level detector 60 in the form of a silicon unijunction transistor is provided. This unijunction transistor 60 is of a conventional form, such as disclosed and claimed in U.S. Patent No. 2,769,926—Lesk, assigned to the assignee of the present invention, and it will therefore be explained only in sufficient detail to provide an understanding of the present invention. Referring now to the unijunction transistor 60, 62 and 63 represent the two bases of the transistor, and 64 represents the emitter of the transistor. The two bases 62 and 63 are connected across a source of control voltage comprising a positive bus 71 and a negative bus 73 between which a constant voltage is maintained. So long as the voltage between the emitter 64 and the lower base 63 is below a certain critical value, called the peak point emitter voltage, a very high resistance is present between the emitter and the two bases, and therefore no significant amount of current flows in the circuit of emitter 64. However, when the emitter voltage is increased to this critical peak point emitter voltage, the transistor 60 fires, i.e., the resistance between its emitter 64 and base 63 suddenly drops, allowing greatly increased current to flow from the emitter 64 through the base 63. This greatly increased current is derived from the timing capacitor 34, which, in response to firing of the transistor 60, quickly discharges through the circuit including the emitter 64 and the base 63. Connected in series-circuit relationship with the lower base 63 is the coil 66 of a tripping relay 65. The abruptly increased current that flows through the base 63 in response to firing of the transistor 60 also flows through this coil 66, causing the relay 65 to pick up and close its contacts 67. Closing of the contacts 67 completes a tripping circuit through a trip coil 68 of the latch 18. The trip coil 68 responds by releasing the latch 18 to allow the breaker 10 to open under the bias of its opening spring 17. When the breaker 10 opens, an "a" switch 69a connected in the tripping circuit opens to interrupt the tripping circuit. The power source for the tripping circuit is shown within a dotted line box S and will be described in more detail hereinafter. It is believed sufficient for the present simply to point out that this power source comprises a positive bus 240 and negative bus 73 common to this and other circuits. The trip circuit extends from the positive bus 240 to the negative bus 73 through the "a" switch 69a, trip coil 68, conductor 67a, and contacts 67.

While we have shown an electromagnetic type tripping relay for initiating tripping in response to firing of level detector 60, it should be understood that other types of electroresponsive switches can equally well be used for initiating tripping in response to firing of the level detector, e.g., a silicon controlled rectifier triggered by the voltage developed when current flows through a suitable resistor (not shown) connected between base 63 and the negative bus 73.

When the recloser opens, the gating relay 45 is dropped out either due to the loss of signal voltage across the smoothing capacitor 26 that results from the interruption of current in power line 12 or due to opening of a conventional "a" switch 68a coupled to the main contacts of the recloser and in series with the coil 46 of the gating relay, depending upon which of these events occurs first. When the gating relay 45 drops out, it closes its contacts 40 to complete the discharge circuit 36 and thus assure that the capacitors of the timing circuit will be drained of their charge.

The closing control portion 19 of the recloser is designed to automatically reclose the circuit breaker 10 after this first opening operation. For producing such reclosing, a suitable closing device, such as a solenoid 70, is provided. The armature of this solenoid 70 is mechanically connected through a suitable mechanism (not shown) to the bridging contact 16 to its closed position of FIG. 1 when the solenoid is energized and operated. The coil of the solenoid 70 is connected in an energizing circuit 76 extending between the opposite terminals 72 and 74 of a suitable source of control power for closing. Also connected in this energizing circuit 76, and in series with the coil of solenoid 70, are a limit switch 75 that is arranged to close in response to opening of the circuit breaker and a set of closing-control contacts 78. When the closing control contacts 78 are closed, they complete this energizing circuit 76 and thus cause the solenoid 70 to drive the recloser's contact 16 into closed position. The closing control contacts 78 are the normally open contacts of a reclosure-initiating relay 79 that is operated to close its contacts 78 in response to circuit breaker opening in a manner soon to be described. When the contacts 16 of the recloser enter their closed position, the limit switch 75 opens to interrupt the energizing circuit for the closing solenoid 70. In addition, a "b" switch 77b in series with the coil of the reclosure-initiating relay 79 opens upon completion of the closing stroke to drop out the relay 79. This "b" switch 77b is mechanically connected to the main contacts of the circuit breaker in a conventional manner (not shown) so as to open when the circuit breaker is closed and to close when the circuit breaker is open.

For controlling the reclosure-initiating relay 79 and for performing certain other control functions soon to be explained, a counting or sequencing device 80 is provided. In its schematic form of FIG. 1, this sequencing device 80 comprises a pair of ratchet wheels 82 and 83 that are fixed to a rotatable shaft 84 for movement in unison. Also fixed to the rotatable shaft 84 are two angularly-movable switching arms 86 and 87 which move in unison with each other and with the ratchet wheels 82 and 83. These switching arms constitute portions of stepping switches E and F, respectively. After each opening operation on which automatic reclosing is desired, this sequencing device 80 operates to set up an energizing circuit for the reclosure-initiating relay 79. This will be explained more fully after the sequencing device is described in greater detail.

The ratchet wheel 82 is normally maintained in its position of FIG. 1 by means of a suitable coil spring 88 urging the ratchet wheel 82 in a counterclockwise direction. A suitable stop 89 provided on the ratchet wheel 82 abuts against a stationary abutment 90 to assure that the ratchet wheel will not move counterclockwise past its position of FIG. 1. When the ratchet wheel 82 is in its position of FIG. 1, each of the switching arms 86 and 87 engages its corresponding first contact, designated 1. When the ratchet wheel is advanced in a clockwise direction through one step (in a manner soon to be explained), the switching arms 86 and 87 are advanced through one step into a position where each engages its next contact 2. Each additional advancing step of the ratchet wheel moves the switching arms 86 and 87 through an additional step, causing each of the switching arms to successively engage its contacts 3, 4, and 5.

When the contact 2 is engaged by the switching arm 87, an energizing circuit for the reclosure-initiating relay 79 is established, and this results in closing of the recloser, as was described hereinabove. This energizing circuit for the reclosure-initiating relay 79 extends from the positive bus 72 through a manually operable switch 92, conductor 93, the conductive switching arm 87, contact point 2, conductors 94, 95, 96, and 97, the then-closed "b" switch 77b, the coil of relay 79 to the negative bus 74. The reclosure-initiating relay 79 responds to completion of this energizing circuit by closing its contacts 78 to produce a reclosing operation. When the contacts 3 and 4 of the stepping switch F are engaged by the switching arm 87, similar energizing circuits for the reclosure-initiating relay 79 are set up, but a detailed description of these will be deferred until later in this application.

The ratchet wheel 82 of the sequencing device 80 is advanced through each of the above described steps in response to opening operations of the recloser. In this regard, each time the recloser is tripped to open, the ratchet wheel is advanced one step. If a series of opening operations should occur in close succession, the ratchet wheel 82 and the switching arms 86 and 87 will move successively through positions 2, 3, 4, and 5. But if more than a predetermined time elapses between opening operations, the return spring 88 will reset the ratchet wheel 82 to its normal position shown in FIG. 1 in a manner soon to be described.

For advancing or notching the ratchet wheel 82 in response to each opening operation of the recloser, a notching pawl 100 is provided. This notching pawl 100 is arranged to be energized by a notching solenoid 102 that is connected in a shunt circuit 103 paralleling the trip coil 68 of the recloser. Thus, each time the tripping relay 65 completes a tripping circuit through the trip coil 68, the notching solenoid 102 is energized to drive the pawl 100 to the right a predetermined distance. During this motion to the right, the notching pawl 100 is in engagement with a tooth of the ratchet wheel 82, and thus the ratchet wheel is advanced in a clockwise direction through one step in response to each tripping operation of the recloser. When the recloser trips open in response to operation of its tripping solenoid 68, the "a" switch 69a opens to disconnect the notching circuit 103 from the positive bus 240 of the tripping source S.

This deenergizes the notching solenoid 102, allowing a reset spring 104 to return the notching pawl 100 to its position of FIG. 1. When the notching pawl returns to its position of FIG. 1, a stationary pin 105 engages the notching pawl, camming it upwardly to disengage it from the periphery of the ratchet wheel 82 so that the ratchet wheel is later able to reset without interference from the notching pawl 100 should more than a predetermined time elapse between successive openings of the recloser.

For preventing the ratchet wheel 82 from resetting to its normal-at-rest position of FIG. 1 between closely successive opening operations of the recloser, a holding pawl 110 acting on the periphery of the other ratchet wheel 83 is provided. This holding pawl is biased about a stationary pivot 111 into engagement with the periphery of ratchet wheel 83 by a spring 112. If successive advancing operations of the notching pawl 100 closely follow one another then the holding pawl 110 will maintain the ratchet wheels 82 and 83 in their advanced position between advancing operations. Under such conditions, the notching operations will have a cumulative effect in advancing the ratchet wheel 82 and will thus drive the switching arms 86 and 87 successively through positions 2, 3, 4 and 5 in response to closely successive opening operations of the recloser 10.

If, on the other hand, the notching operations of notching pawl 100 do not closely follow one another, the holding pawl 110 will eventually be disabled, i.e., moved out of engagement with the ratchet wheel 83 to allow resetting of ratchet wheels 82 and 83 back to their position of FIG. 1 under the influence of reset spring 88. Such disabling of the holding pawl 110 is effected (in a manner soon to be described) by a reset solenoid 114 which operates a predetermined time after the recloser 10 reaches closed position to drive the holding pawl 110 clockwise out of engagement with ratchet wheel 83, assuming that the recloser remains closed. In more general terms, the overall effect of this resetting operation is to restore the sequencing device 80 to its normal at rest position of FIG. 1 in the event that the recloser is able to remain closed, say, as a result of the fault on the power line 12 disappearing or having been removed.

As was pointed out hereinabove, the switching arm 87 of the stepping switch F sets up an energizing circuit for the reclosure-initiating relay 79 each time it moves into new positions 2, 3 and 4. The energizing circuit for relay 79 that is established by movement of the switching arm 87 into position 2 has been described hereinabove. Briefly summarizing, however, this energizing circuit extends from the positive bus 72 to the negative bus 74 through the conductive parts 92, 93, 87, 2, 94-97, 77b and 79. Completion of this energizing circuit causes the reclosure-initiating relay 79 to operate and thus effect closing of the recloser. Should the fault on power line 12 still be present when the recloser is reclosed, then the recloser would again trip open and notching solenoid 102 would respond by advancing the switching arm 87 through another step into contact position 3. Movement of the switching arm into the contact position 3 results in completion of another energizing circuit for reclosure-initiating relay 79, but only after a predetermined time delay, which constitutes a time delay between opening and reclosing of the circuit breaker. In this regard, movement of the switching arm 87 into position 3 first produces energization of a time delay pick-up relay 120. This relay 120 is preferably of the thermally-operated type so that it closes its contact 122 after current has flown through its thermal element for a predetermined period. When the contacts 122 are closed after this predetermined period, they complete an energizing circuit for the reclosure-initiating relay 79 to effect another closing operation of the recloser. The energizing circuit for the thermal relay 120 is through conductive parts 93, 87, 3, conductor 124, the thermal element of relay 120, and conductor 126 to the negative bus 74. The energizing circuit for the reclosure-initiating relay 79 that results from closing of the contacts 122 of the thermal relay is from bus 72 through conductive parts 92, 93, 87, 3, conductor 124, contacts 122, conductors 127, 95, 96, 97, 77b, and the coil of relay 79 to the negative bus 74.

Should the fault on the line 12 still be present when the recloser closes, the recloser will again trip open and notching solenoid 102 would respond by advancing the sequencing device 80 one step to move the switching arm 87 into its position 4. This results in completion of another energizing circuit for reclosure-initiating relay 79, but only after a predetermined time delay, which constitutes a time delay between the third opening and reclosing of the circuit breaker. This time delay is introduced by another thermally controlled relay 130 (corresponding to the previously described relay 120) which operates after a predetermined interval to close its contacts 132 and complete an energizing circuit for the reclosure-initiating relay 79 that extends through the switching arm 87, contact 4, contacts 132, and conductor 134. The reclosure-initiating relay 79 responds by again causing the recloser to reclose.

If the fault should still be present on power line 12 when the third reclosing has occurred, the recloser will again trip open, but after this opening operation no further reclosing operations will occur until the recloser is manually reset. In other words, the recloser will be locked out.

This lockout action occurs by virtue of the fact that the switching arm 87 moves into contact position 5 after the fourth closely successive opening operation. No circuit through the reclosure initiating relay 79 results from motion of the switching arm 87 into position 5 because the reclosure-initiating relay 79 is isolated from the contact 5 by means of a then-open "a" switch 136a. This switch 136a is controlled in a known manner (not shown) by the position of the circuit breaker and opens as soon as the breaker opens, closing when the circuit breaker closes. Thus, no energizing circuit for the relay 79 can be established through contact point 5. Since no other connections are then present from the relay 79 to the positive bus 72, the reclosure-initiating relay 79 remains deenergized and thus no further closing operations of the recloser occur.

To provide an indication of lockout, a lockout-indicating light L is provided in circuit with the contact 5 of the switching arm 87. When the switching arm 87 reaches contact 5, an energizing circuit through this lockout-indicating light would be established. This energizing circuit extends from positive bus 72 through parts 92, 93, 87, 5, 137 and L to the negative bus 74.

As was pointed out hereinabove, sequencing device 80 is adapted to reset to its normal-at-rest position of FIG. 1 if the breaker should remain closed after any reclosing operation prior to lockout. This resetting action is effected by releasing the holding pawl 110 from the ratchet wheel 83 a predetermined time after the breaker reaches closed position should it remain closed. A resetting solenoid 114 is relied upon for such resetting and is controlled by a normally-open switch 150 which is caused to close a predetermined time after the breaker reaches closed position should the breaker remain closed. For effecting closing of the normally open switch 150 in this manner, a timing motor 152 and a rotary cam 154 coupled to the rotor of the motor 152 are provided. As soon as the breaker reaches closed position, the motor 152 is energized through a circuit that includes the last contact made by the switching arm 87. For example, when the switching arm is in position 2, this circuit for motor 150 extends from the positive bus 72 through conductive parts 92, 93, 87, 2, 94, 95, 96, 155, a then-closed "a" switch 157a, conductors 158, 159, then-closed switch 160, and then through the motor 152 to the negative bus 74. This circuit is completed upon closing of the circuit breaker by the "a" switch 157a which is controlled in a conventional manner (not shown) to open in response to closing of the circuit breaker, so that operation of the motor 152 begins only when the recloser reaches closed position. The motor responds by driving the cam 154 clockwise in a direction to close the switch 150. If the breaker remains closed for a long enough time, the cam 154 will eventually close the switch 150 and shortly thereafter open the limit switch 160. Closing of the switch 150 completes an energizing circuit for the reset solenoid 114 through the conductive parts 163, 150, 162, etc. Completion of this energizing circuit causes the solenoid 114 to release the holding pawl 110 and allows the counting device 80 to reset under the influence of its reset spring 88, as described hereinabove.

Had the recloser, instead of remaining closed, reopened shortly after reclosing, then no release of the holding pawl would have occurred. In this connection, opening of the recloser would have taken place before the timer motor 152 would have had an opportunity to close the switch 150, and thus the timing motor would have been deenergized by the opening of the "a" switch 157a, which opens when the recloser opens.

This would have allowed motor-reset spring 165 to quickly return the cam 154 to its normal position of FIG. 1, and no releasing of the holding pawl 110 would have occurred. This would permit cumulative advancement of the sequencing device, as desired.

Certain features of the resetting means for the sequencing device 80 are the invention of A. L. Streater and R. H. Miller and are described in more detail and claimed in application S.N. 121,684, filed July 1, 1961, and assigned to the assignee of the present invention.

Most present day reclosers have two time-current characteristics controlling the period of time that elapses between the instant that overcurrent commences and the instant that the recloser opens its contacts. Typically, the first one or two opening operations in a series of closely successive opening operations occur with relatively little time delay, but subsequent opening operations occur with appreciably greater time delay. The opening operations that occur with little time delay will be referred to hereinafter as quick opening operations, whereas those opening operations that occur with appreciably greater time delay will be referred to as delayed opening operations.

For determining whether an opening operation shall be a quick operation or a delayed operation, the disclosed recloser relies upon the switching arm 86 to control the amount of capacitance that will be present in the R-C timing circuit for each opening operation. In this connection, a capacitor 200 having a relatively large capacitance in comparison to that of capacitor 34 is provided; and the switching arm 86 switches this capacitor 200 into the R-C circuit in parallel relationship to the capacitor 34 for those opening operations that it is desired should be delayed opening operations.

In this connection, the capacitor 200 has one of its terminals connected to the negative terminal of capacitor 34 through the negative bus 73 and has the connection between its other terminal and the conductor 210 on which signal voltage appears controlled by the switching arm 86. The contact points 1, 2, 3 and 4 of the switching arm 86 are connected to the positive terminal of the capacitor 200, and in each of these connections there is a manually operable switch that can be opened if it is desired that the opening operation corresponding to that particular point be a quick operation or can be closed if it is desired that the corresponding opening operation be a delayed operation. In the disclosed recloser, the manually operable switches 201 and 202 for the contact points 1 and 2, respectively, are shown open; and the manually-operable switches 203 and 204 for the contact points 3 and 4 are shown closed. Accordingly, the recloser is set so that the first two opening operations will be quick operations and the third and fourth opening operations will be delayed operations.

In this regard, the switching arm 86 will be in contact position 1 during the timing interval immediately preceding the first opening operation, and hence the capacitor 200 will be out of the circuit for this first opening operation due to the open switch 201 and will therefore introduce no delay. As pointed out hereinabove, the first opening operation results in the notching solenoid 102 advancing the ratchet wheel 82 and the switching arm 86 through one step into contact position 2. If a second opening operation should closely follow the first opening operation, the switching arm 86 would be in contact position 2 during the timing interval immediately prior to the second opening operation, and thus the capacitor 200 would again introduce no delay, this time due to the open switch 202.

If a third opening operation closely follows the second one, the switching arm 86 would be in contact position 3 during the timing interval immediately preceding the third opening operation. This would result in capacitor 200 being connected in the R-C timing circuit during this interval, and thus the third opening operation would be delayed. The circuit that connects the capacitor 200 in the R-C circuit in parallel with the smaller capacitor 34 extends from the signal voltage bus 210 through conductor 212, switching arm 86, contact point 3, switch 203, and the capacitor 200 to the negative bus 73.

If a fourth opening operation closely followed the third opening operation, the switching arm 86 would be in contact position 4 during the time interval immediately preceding the fourth opening operation, and this would result in the capacitor 200 again being present in the R-C timing circuit to delay opening inasmuch as the switch 204 is closed.

Figure 3:
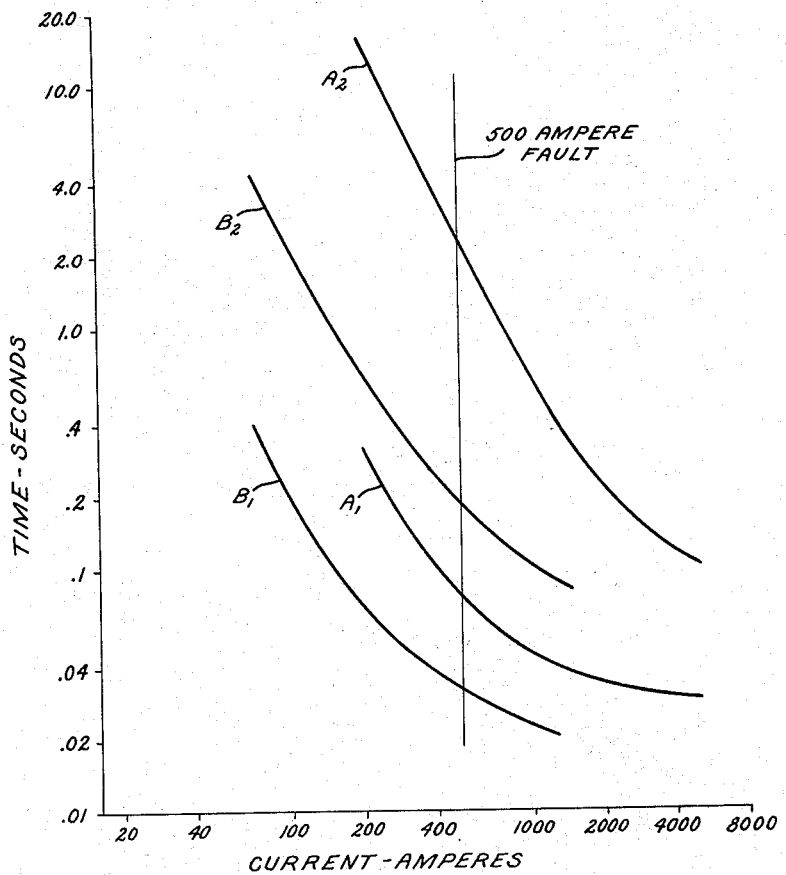
FIG. 3 is a graphic illustration of certain of the operating characteristics of the reclosers depicted in FIG. 2.

The time-current characteristics of the recloser during these opening operations are graphically depicted in FIG. 3, where the time required to initiate opening is plotted against the current in the power line 12. Typical time and current values have been applied to the ordinates of this graph. During the first two opening operations, i.e., when the capacitor 200 is out of the R-C timing circuit, the recloser's opening time characteristics will be in accordance with curve $A_1$. During the next two opening operations, i.e., when the capacitor 200 is connected in the R-C timing circuit, the recloser's opening time characteristics will be in accordance with curve $A_2$. It will be apparent from these curves that when the recloser is operating on curve $A_1$, an appreciably shorter time delay will occur before opening for a given overcurrent than would occur if the recloser were operating on curve $A_2$ for the same value of overcurrent.

In an electrical system that includes circuit interrupters that operate with inverse time-current characteristics, it is customary to coordinate the operation of the circuit interrupters by adjusting their respective opening controls in such a manner that the further an interrupter is from the source of power, the shorter will be its opening time for a given overcurrent. This can be more readily understood by referring to the one line diagram of FIG. 2, where two reclosers A and B are shown connected in the power line 12 for conveying power from a power source, such as the transformer 220, to various circuits connected to the power line 12. The recloser A is connected between the power source 220 and the recloser B. Branch circuits 225 and 226 are connected to the power line 12 between the reclosers A and B, and other branch circuits such as 227 are connected to the power line 12 beyond B. To facilitate an understanding of the problem that the present invention is concerned with, it will first be assumed that both reclosers A and B are of a conventional design and that each is adjusted to provide an opening sequence of two quick opening operations followed by two delayed opening operations. The usual manner of coordinating in this type of system is to adjust the more remote recloser B so that it operates more quickly for a given overcurrent than the recloser A that is closer to the power source 220. For example, referring to FIG. 3, the recloser B is adjusted to operate on time-current curve $B_1$ for its quick operations and on time-current curve $B_2$ for its delayed operations. The recloser A is adjusted to operate on time current curve $A_1$ for its quick operations and on time-current curve $A_2$ for its delayed operations. Assume now that a fault occurs at a point G beyond recloser B and that this results in a current above the pickup ratings of both reclosers flowing in the power line 12 through both reclosers. For example, assume that this current is 500 amperes, as indicated by the dotted line of FIG. 2. This is well above the 70 ampere pickup rating that will be assumed for recloser B and the 200 ampere pickup rating that will be assumed for recloser A. Since curve $B_1$ is below $A_1$, it will be apparent that recloser B will operate before recloser A has an opportunity to operate. This is as desired since ordinarily only the recloser B need be opened to clear any fault beyond recloser B. The recloser A should ideally remain closed so that uninterrupted service can be maintained over the branch circuits 225, 226 connected to the power line 12 between the reclosers A and B. It is only when the remote recloser B fails to clear the fault or when a fault occurs between A and B that the recloser A should open.

For ordinary circuit interrupting devices that have only a single time-current characteristic, this desired selectivity in operation can ordinarily be achieved simply by relying upon the relative positions of the respective time-current curves, such as $A_1$ and $B_1$, of the devices. But for reclosers that each have two time-current characteristics, proper selectivity is more difficult to achieve. In this regard, once the recloser B has opened twice in close succession, its time-current opening characteristics shift from curve $B_1$ to $B_2$ so that closely-succeeding opening operations will be relatively slow. When this occurs, the recloser B instead of being the quicker of the two reclosers is the slower inasmuch as recloser A is still operating on its curve $A_1$, which is below curve $B_2$. Thus, when overcurrent flows through power line 12 after the recloser B has reclosed following two closely successive opening operations, the recloser A is the first to respond and does so by opening before the recloser B can open. When recloser A recloses immediately after this opening operation, it is still set to operate on curve $A_1$ and thus will again open before recloser B has had time to do so. When recloser A recloses after the second opening, its opening characteristics have shifted to curve $A_2$, which is above curve $B_2$, and thus recloser A is once again the slower of the two reclosers. Thus, if the fault at G is still present on power line 12 at this time, recloser B will again open before recloser A has had time to open. If the fault is still present when recloser B is reclosed, recloser B will again open before recloser A has an opportunity to do so and will thereafter remain opened, or locked-out, thus isolating the fault from the remainder of the system, as desired.

The problem, though, is that during the above described sequence of operations, recloser A has twice opened branch circuits 225 and 226 unnecessarily. This not only results in undesirable service interruptions over branch circuits 225 and 226 but also results in unnecessary wear of the contacts of the recloser A.

The present invention is concerned with preventing these unnecessary openings of recloser A. One possible way of accomplishing this result would be to set recloser A to perform all of its opening operations on retarded curve $A_2$. But this would have undesirable consequences since it would render the recloser A no longer capable of responding at high speed to faults between A and B. This would be disadvantageous since many such faults are of a temporary nature and can be cleared with the desired minimum of system disturbance if the recloser A is capable of responding quickly. Thus, an object of our invention is to prevent unnecessary openings of the recloser A, yet without impairing the ability of recloser A to respond in its intended quick manner to faults between A and B.

Figure 2:
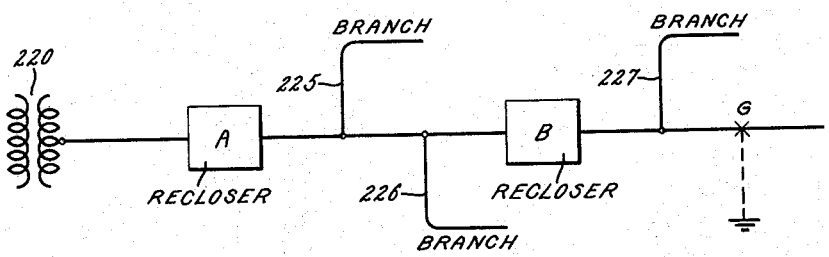
FIG. 2 is a one-line circuit diagram illustrating an application of the recloser of FIG. 1.

If it be assumed that the recloser of FIG. 1 is used as the recloser A of FIG. 2, then, generally speaking, we accomplish this object of our invention by advancing the sequencing device 80 of recloser A one step out of its normal position of FIG. 1 each time the current in power line 12 exceeds the pickup value of recloser A and then drops below this pickup value. In this regard, assuming a fault at G in FIG. 2, each time the recloser B of FIG. 2 operates to interrupt overcurrent in the power line 12, the sequencing device 80 of recloser A is advanced one step, just as though recloser A itself had opened. Accordingly, when the recloser B first begins operating on its curve $B_2$ after a predetermined number of opening operations, the recloser A has already shifted to its curve $A_2$, and thus the two reclosers are coordinated without the above described need for first producing undesirable opening operations of recloser A.

For advancing the sequencing device 80 in the manner described in the immediately preceding paragraph, an auxiliary notching circuit 250 is provided. This auxiliary notching circuit 250 contains a notching capacitor 252 normally connected in shunt with the coil of notching solenoid 102. The charge on this capacitor 252 is controlled by a set of normally closed contacts 254 connected between one terminal of the capacitor 252 and the notching solenoid 102 and by another set of contacts 256, normally open, connected between the same terminal of the capacitor and the negative bus 73. The connection between the contacts 256 and the negative bus is designated 258. Under the normal conditions depicted in FIG. 1, there is no appreciable charge on the capacitor inasmuch as both terminals of the capacitor 252 are connected together through the closed contacts 254 and no current is flowing in circuit 103. When, however, the contacts 254 are opened and the contacts 256 are closed, the notching capacitor 252 is connected across the source S of tripping voltage and thus quickly accumulates a charge. Restoration of the contacts 254, 256 to their normal position of FIG. 1 results in a discharge circuit being completed for the capacitor 252 between its terminals through the notching solenoid 102 and the then-closed contacts 254. When the capacitor 252 discharges through this circuit, the resulting current operates the notching solenoid 102, causing it to advance the sequencing device 80 one step. It will be apparent from FIG. 1 that during this discharge of the capacitor 252, the trip coil 68 is effectively connected in parallel with the notching solenoid 102 across the capacitor 252. No significant discharge current can flow through the trip coil, however, because a blocking rectifier 266 is connected in series therewith but in parallel with the notching solenoid 102.

For controlling the contacts 254, 256 to produce the notching operation at the desired time, an auxiliary relay 260 is provided. The contacts 254, 256 constitute the contacts of this auxiliary relay 260. The coil of the auxiliary relay 260 is connected across the source of D.-C. control voltage, i.e., between positive bus 71 and negative bus 73. In series with the coil of auxiliary relay 260 is a set of normally open contacts 262 carried by the gating relay 45. When the gating relay picks up in response to an overcurrent in power line 12 in the manner previously described, it closes its contacts 262 to pick up the auxiliary relay 260. In picking up, the auxiliary relay 260 opens its contacts 254 and closes its contacts 256 to connect the capacitor 252 across the source S of tripping voltage to accumulate a charge. When the gating relay drops out in response to interruption of the overcurrent condition in power line 12, the auxiliary relay also drops out to restore contacts 254, 256 to their normal position of FIG. 1. The capacitor 252 then responds by discharging through the coil of notching solenoid 102 in the manner described in the preceding paragraph to produce the desired advancement of the counting device 80 through one step. It will be apparent that a charging circuit for the capacitor 252 was established in response to initiation of an overcurrent condition in power line 12 and that discharge of the capacitor 252 and corresponding notching through one step were effected in response to interruption of this overcurrent condition in power line 12. It will be apparent that this notching action by energy derived from the capacitor 252 is effected whether there is or is not a drop in the voltage on power line 12. At any rate, no drop in this voltage is needed in order to effect the desired notching. In referring in this application to the kind of interruption or termination of an overcurrent condition that causes advancement of the sequencing device 80 through one step, applicants mean a reduction in the current magnitude to a value below the pickup current of recloser A, whether the reduction be to some finite value or to zero.

The reason for delaying advancement of the sequencing device until the recloser has tripped or the overcurrent condition has been terminated is to avoid shifting from one time-current characteristic to another while the recloser is being timed to trip. For example, had the sequencing device been advanced, say from position 2 to position 3, appreciably ahead of this instant, the recloser would be shifted from quick operation to delayed operation, and this would interfere with any quick opening operation of the recloser A that might be needed for proper coordination.

The sequencing device 80 will be advanced only a single step for each overcurrent condition whether the overcurrent condition is terminated by the recloser itself or by some other means. In this regard, if the overcurrent condition is terminated by means other than the recloser, only a single impulse will be delivered to the notching solenoid 102, as was described hereinabove. This single impulse will cause the notching solenoid 102 to move its armature only a single time to the right, thus advancing the sequencing device 80 only a single step. If, on the other hand, the overcurrent should be one that causes opening of the recloser itself, then the capacitor 252 will discharge during the tripping operation through a circuit that extends from the positive terminal of the capacitor 252, through the parallel combination of the trip coil 68 and the notching solenoid 102, the conductor 67a, then-closed contacts 67, negative bus 73, the conductor 258, and contacts 256 to the negative terminal of the notching capacitor 252. This circuit is interrupted by the auxiliary relay 260 when it drops out to open its contacts 256 in response to the recloser's opening to interrupt the power circuit 12. When the relay 260 drops out in this manner there will be insufficient charge remaining on the capacitor 252 to result in any significant continued current through the coil of notching solenoid 102. Thus, we prevent the capacitor 252 from producing an extra notching operation under these conditions by discharging the capacitor 252 during the tripping operation.

The design of the power source S for the tripping circuit plays a significant part in enabling the notching capacitor 252 to discharge in the above-described manner during a tripping operation. In this regard, this tripping power source S comprises a transformer 271 with an internal impedance designated 272 and a large capacitor 273 connected across the terminals of the secondary winding of the transformer 271. The capacitor 273 is normally maintained in a charged condition by current supplied from the transformer 271 through a rectifier 275. When the tripping relay 65 closes its contacts 67, this source capacitor 273 quickly discharges through the tripping circuit 67a and the notching circuit 103 to effect the desired tripping of the recloser and operation of the notching pawl 100 through one step. The much smaller notching capacitor 252 is connected in parallel with the capacitor 273 during this discharging operation, and is thus able to discharge as the voltage on source capacitor 273 rapidly decays. The internal impedance 272 of the transformer 271 is relatively high so that the voltage on the source capacitor 273 decays rapidly when the trip circuit 67a is completed. Recharging of the source capacitor 273 takes place relatively slowly due to the impedance 272 but quick enough so that the source capacitor 273 is always fully charged by the time a reclosing operation can be completed. The fact that the contacts 69a are open during this recharging operation insures that the notching capacitor 252 will not be unintentionally recharged.

In view of the above described mode of operation of recloser A, it will be apparent that the sequencing device 80 of recloser A is advanced one step in response to each interruption of the power circuit 12 by the other recloser B, so that when the other recloser B is reclosed after the second quick opening operation, the recloser A still has a slower speed of response than recloser B and therefore will not open ahead of recloser B. Thus, even after the recloser B has twice operated and has shifted to its delayed curve $B_2$, the two reclosers A and B are still coordinated, and unnecessary opening operations of the recloser A will not occur. More specifically, if the fault persists after B recloses the second time, B will again open before recloser A has time to do so. If the fault persists after B recloses the third time, B will again open before recloser A and will lock out.

When the recloser B locks out, it ordinarily isolates the fault at G from the remainder of the power system. With the fault so isolated, it is desirable to reset the recloser A to its normal-at-rest position of FIG. 1 so that it can again operate through its complete normal sequence in response to subsequent faults on the portion of the power system between A and B. To effect such a resetting of the recloser A after the fourth interruption of power circuit 12, the "a" switch 136a in the reclosing portion 21 of the recloser is utilized. It will be recalled that this "a" switch, being sensitive to the position of the recloser, is closed when the recloser is closed. Thus, when the switching arm 87 is advanced into contact position 5 in response to the fourth opening operation, it completes an energizing circuit through the "a" switch 136a for the reset motor 152. This energizing circuit extends from the positive bus 72 through conductive parts 92, 93, 87, 5, 137, 136, 159, 160 and 152 to the negative bus 74. Completion of this energizing circuit causes the motor 152 to rotate the cam 154 clockwise to close switch 150 and thereby operate reset solenoid 114. This releases holding pawl 110, causing the sequencing device 80 to reset to its normal-at-rest position of FIG. 1 under the influence of reset spring 88. Thus, instead of the usual locking out in response to a fourth notching operation, a resetting operation occurs, with the result being that the recloser is restored to its normal-at-rest position of FIG. 1. Had the recloser been open instead of closed while the switching arm 87 was in its contact position 5, the "a" switch 136a would also have been open and thus no energizing circuit for the reset motor 150 would have been completed. Under such circumstances, the recloser would remain locked out, as would be desired.

It should be apparent from the above description that the presence of the auxiliary notching circuit 250 in no way interferes with the ability of the recloser to open in its intended manner in response to an overcurrent that is not cleared by the recloser B, either because a failure of B or because the fault was located between A and B. In this regard, if such an overcurrent condition is present, the level detector 60 of recloser A is fired to produce operation of the tripping relay 65, and this result in tripping of the recloser A in substantially the same manner as if the auxiliary notching circuit 250 were not present. The notching capacitor 252 is so small that it introduces no appreciable delay into such tripping operations. The blocking rectifier 266 does not interfere with this tripping operation inasmuch as it offers no significant impedance to current flowing from the positive bus 240 to the negative bus 73.

In the embodiment of FIG. 1, we have caused the counting device 80 to advance one step each time an overcurrent condition in the power line 12 is terminated, whether the termination be effected by recloser A, recloser B or some other means. In FIG. 4 there is shown a modified embodiment in which the sequencing device 80 will advance in response to overcurrent interruptions by means other than its own recloser only to the point at which the recloser's opening characteristics are shifted to delayed operation. Beyond that point the sequencing device 80 will advance only in response to opening of its own recloser. This arrangement eliminates the need for unnecessary notching operations once the recloser A has been shifted to delayed operation and also eliminates the need for providing special means to reset the recloser to its normal-at-rest position after recloser B locks out. In the embodiment of FIG. 4 reference numerals identical to those of FIG. 1 have been used to designate corresponding parts of the two reclosers. The reclosing portion of the recloser has not been shown in FIG. 4 since it is the same as that shown in FIG. 1 except that the dotted line connection 136 of FIG. 1 is omitted when this reclosing portion 19 is used in the recloser of FIG. 4. In the tripping and notching portion 21 of the recloser, the basic difference in circuit between the two embodiments is that in FIG. 4, the conductor 258 is connected to the negative bus 73 through a stepping switch 290 rather than directly as in FIG. 1. This stepping switch 290 comprises a switching arm 292 fixed to the shaft 84 so that it moves in unison with the switching arms 86 and 87, engaging its contacts 1, 2, 3 and 4 at the same time that the switching arms 86 and 87 engage their respective contacts 1, 2, 3 and 4. In series with the contacts 1, 2, 3 and 4 respectively of the stepping switch 292 are manually-operable switches 301, 302, 303 and 304. When any one of these switches 301–304 is closed, it provides a connection between its corresponding contact point and the negative bus 73 through the conductor 306. Manually-operable switch 301 is mechanically coupled to manually-operable switch 201 for simultaneous operation therewith so that its opens when manually-operable switch 201 closes, and vice versa. Manually-operable switch 302 is mechanically connected to manually-operable switch 202 for simultaneous operation therewith so that it opens when the manually-operable switch 202 closes, and vice versa. The same type of mechanical connections are present between manually-operable switches 203 and 303 and between manually-operable switches 204 and 304.

When the recloser is set for two quick opening operations followed by two delayed opening operations, the switches 201 and 202 are opened and the switches 203 and 204 are closed; whereas the switches 301 and 302 are closed and the switches 303 and 304 are open.

When the first overcurrent occurs, the switching arm 292 is in its position 1 and thus one terminal of the notching capacitor 252 is connected to the negative bus 73 through closed switch 301. The capacitor 252 is thus charged in exactly the same manner as described with respect to FIG. 1 in response to the first overcurrent. The capacitor 252 also discharged in the same manner as described in connection with FIG. 1 to operate the notching solenoid 102 and advance the sequencing device 80 one step in response to termination of the overcurrent condition.

When the second overcurrent occurs, switching arm 292, having been advanced one step, is in position 2. Thus one terminal of the notching capacitor 252 is again connected to the negative bus 73, this time through closed switch 302. As a result, another notching operation takes place when the overcurrent condition is terminated. This second notching or advancing operation moves the switching arms 86 and 292 into their respective contact positions 3.

Once the sequencing device 80 reaches contact position 3, it will advance further only in response to an opening operation by the recloser A itself. If the overcurrent is interrupted by recloser B or by some other means apart from the recloser A, the sequencing device 80 will simply remain in its contact position 3. With the sequencing device in this position, the recloser A is set for delayed opening and is therefore properly coordinated with the recloser B, so that it is unnecessary to proper coordination that the sequencing device be further advanced in response to interruptions other than its own. By eliminating these superfluous notching operations, we can prolong the working life of our sequencing device.

The reason that the sequencing device 80 will not advance past contact position 3 in response to interruptions of the power circuit 12 by means other than its own recloser is that the notching capacitor 252 will not be charged during overcurrents once the switching arm 292 has advanced into position 3. This is the case because the manually-operable switches 303 and 304, associated with contact positions 3 and 4 of switching arm 292 are open. Thus, when the switching arm 292 is in contact position 3, the conductor 258 is isolated from the negative bus due to the open switch 303. Thus, no charge accumulates on the notching capacitor 252 when the auxiliary relay 260 operates to open its contacts 254 and close its contacts 256. In effect, the connection to one terminal of the notching capacitor 252 is open circuited. Since no charge accumulates on the capacitor 252, no significant amount of energy is released from the capacitor when the auxiliary relay 260 drops out to close its contacts 254 in response to termination of the overcurrent condition, and thus no energy is available from the capacitor to operate the notching solenoid 102.

If the power circuit 12 is restored after the third interruption and the fault is still present, over-current will flow for a fourth time through the power line 12. Since both reclosers A and B are then set for delayed opening, recloser B will operate before A has time to open. If this is the fourth opening operation in close succession for recloser B, recloser B will lock out and thus permanently isolate the fault from the remainder of the circuit.

No further advancement of sequencing device 80 would occur in response to this fourth overcurrent inasmuch as notching capacitor 252 would not be charged during this fourth overcurrent. This follows from the fact that switching arm 292 is then in position 3 and thus one terminal of the notching capacitor 252 is open circuited by means of the open switch 303. Since notching capacitor 252 is not charged during this fourth overcurrent, then it supplies no energy for notching when the overcurrent is interrupted.

The recloser A will automatically reset to its normal-at-rest condition a predetermined time after the fourth overcurrent is interrupted by recloser B, since the reset motor 152 will be energized when the switching arm 87 of FIG. 1 moves into position 3. Referring to FIG. 1, this energizing circuit is from the positive bus 72 through parts 92, 93, 87, 3, 124, 122, 95, 96, 155, 157a, 158, 159, 160 and 152 to negative bus 74. The reset motor would begin operating immediately after the thermal switch 122 closed following entry of the switching arm 87 into contact position 3. But the time required for the reset motor to close the switch 150 to effect release of the holding pawl 110 for the sequencing device 80 is sufficiently long to permit a third reclosing and a fourth opening of the recloser to occur before the switch 150 is closed by the reset motor 152. By having a delay of at least this duration premature resetting of recloser A is prevented. Recloser A is accordingly allowed to reset only after a fourth closely successive overcurrent is interrupted.

It will be apparent that this reset action takes place without any need for the dotted line connection 136 in the reclosing portion 19 of the controls shown in FIG. 1. Thus, this connection 136 and the switch 136a are eliminated when the reclosing portion of the control is used with the recloser of FIG. 4.

Had the third and fourth overcurrents been interrupted by the recloser A, then advancement of the sequencing device would have occurred in the usual manner in response to each of these opening operations. In this respect, when the tripping circuit was complete through closing of contacts 67 on each of these opening operations, the notching solenoid 102 would have been operated to effect advancement of the sequencing device 80.

During the fourth opening operation of recloser A, the switching arm 87 of FIG. 1 would move into contact position 5 and would complete a lock-out indicating circuit through the lock-out light L. No reclosing circuit would be initiated inasmuch as movement of the switching arm 87 into contact position 5 does not result in operation of the reclosure-initiating device 79.

Another advantage of the embodiment of FIG. 4 is that it is capable of providing one or more time delayed opening operations after the recloser B goes to lock-out should a fault develop between A and B before recloser A can reset to its normal-at-rest position. In this regard, assume that the switching arms 86 and 292 of the recloser A are in position 3 when the recloser B locks out. Should a fault develop between A and B before recloser A has a chance to reset to its normal-at-rest position of FIG. 4, the recloser A would respond to the fault current by opening with a time-delay inasmuch as switching arm 86 would be in position 3, connecting capacitor 200 into the timing circuit. If the fault were still present after reclosing, another time-delayed opening operation would occur inasmuch as the switching arm 86 would then be in position 4. After this opening, the recloser A would lock out as a result of movement of the switching arm 87 of FIG. 1 into position 5, as has been described hereinabove.

If it is desired to vary the number of instantaneous opening operations that will occur with the recloser of FIG. 4, this can be done simply by changing the position of one or more of the switches 201–204. For example, if it is desired to set the recloser for only one quick operation followed by three delayed operations, then the switch 202 associated with contact point 2 should be closed. This would result in timing capacitor 200 being switched into the timing circuit after the first opening operation so that subsequent closely following operations would be delayed. Also, the closing of switch 202 would result in opening of the switch 302 mechanically connected thereto. Opening of this switch 302 would result in the sequencing device 80 advancing into position 2 in response to any interruption of an overcurrent in power line 12. But after the sequencing device reached contact position 2, no further advancement of the sequencing device 80 would occur except in response to opening of recloser A itself. This follows from the fact that the capacitor 252 cannot be charged so long as one of its terminals remains isolated from the negative bus.

The time required for the motor 152 to reset the sequencing device after the motor is first energized is adjusted so as to be sufficiently long to prevent the sequencing device from resetting before the other recloser B can complete its entire sequence of operations to lock out.

After the recloser A of FIG. 1 has locked out, it can be manually reset to its closed position by means of the manually-controlled switch 92. More specifically, if this switch 92 is transferred to contact point 310 it completes an energizing circuit for the reset solenoid 114 from positive bus 72 through the parts 92, 310, 312 and 114 to negative bus 74. This releases the holding pawl 110 allowing the sequencing device 80 to reset to its normal-at-rest position. Resetting action of the sequencing device takes place quickly, and as soon as it is completed, the switch 92 is returned to its position shown in FIG. 1. This completes a circuit for the reclosure-initiating device 79, which responds by closing its contacts 78 to produce a breaker-closing operation. The energizing circuit for the reclosure-initiating relay 79 extends from the positive bus 72 to the negative bus 74 through the conductive parts 92, 93, 87, 1, 314, a "b" switch 315b which is sensitive to breaker-position and is closed when the breaker is open, conductors 316, 96, 97, 77b and 79.

In FIG. 5 there is shown still another modified form of our invention. In this modification, energy for operating the notching solenoid 102 is derived from the notching capacitor 252 for those overcurrents that cause the recloser to open as well as for those overcurrents that are of insufficient duration to cause opening. In the modification of FIG. 5, reference numerals identical to those of FIG. 1 have been used to designate corresponding parts of the two reclosers. The reclosing portion of the recloser has not been shown in FIG. 5 since it is identical to that shown at 19 in FIG. 1. Similarly, the remainder of the tripping portion of recloser has not been shown in FIG. 5 since it is identical to that shown at 21 in FIG. 1. Referring now to FIG. 5, each time an overcurrent occurs in the power line 12 the contacts 262 of the gating relay 45 are picked up, as was described in connection with FIG. 1. This completes an energizing circuit for auxiliary relay 260 from positive bus 71 to negative bus 73, causing the relay 260 to pick up and close its contacts 256 and open its contacts 254. Closing of the contacts 256 connects the notching capacitor 252 between the fixed voltage positive bus 71 and negative bus 73, thus causing the notching capacitor to be quickly charged from the positive bus 71. When the overcurrent condition in power line 12 is terminated, either by opening of the recloser of FIG. 5 or by another recloser down the line from the recloser of FIG. 5, the gating relay 45 drops out, opening its contacts 262 and thus allowing the auxiliary relay 260 to drop out. In dropping out, the auxiliary relay 260 closes its contacts 254, and this completes a discharge circuit for the notching capacitor 252 through the coil of notching solenoid 102. This discharge circuit extends from the positive terminal of notching capacitor 252, through contacts 254, conductor 103, notching solenoid 102, conductor 401, negative bus 73, and the conductor 403 to the negative terminal of the notching capacitor 252.

The discharge current from capacitor 252 that flows through this discharge circuit upon its completion operates the notching solenoid 102, causing it to advance the sequencing device 80 through one step. Thus, it will be apparent that each time an overcurrent condition in power line 12 is terminated, the sequencing device 80 will be advanced one step. This will be the case whether the overcurrent condition is terminated by opening of the recloser of FIG. 5 or by some other means. In case the overcurrent is one that causes the recloser of FIG. 5 to open, advancement of the sequencing device 80 will occur immediately after the recloser completes the interrupting operation rather than slightly ahead of this point, as would be the case with the recloser of FIG. 1. In other respects, the recloser of FIG. 5 operates in generally the same manner as that of FIG. 1.

Although the above description has been concerned primarily with automatic circuit reclosers, it will be apparent that certain features of the invention in their broader aspects have application to other types of sectionalizing devices, such as line sectionalizers that have no appreciable current-interrupting ability but open and lockout only after a series of overcurrent conditions have been terminated. The term "sectionalizing device," as used in the claims, is intended to comprehend a recloser as well as such a line sectionalizer.

FIG. 6 shows still another way of advancing the sequencing device 80 one step in response to termination of an overcurrent condition, whether the overcurrent condition is terminated by the recloser itself or by some other means. This modification of FIG. 6 is the same as that of FIG. 5 except for certain of the parts shown in the partial view of FIG. 6, it being understood that the circuitry of FIG. 6 is incorporated in the recloser of FIG. 1 in generally the same manner as the circuitry of FIG. 5. Thus, when the gating relay 45 of FIG. 1 picks up to close its contacts 262 in response to an overcurrent condition, an energizing circuit is completed for the notching control relay 260 of FIG. 6 between the positive and negative buses 71 and 73, respectively. The notching control relay 260 responds by picking up to close its contacts 256. This completes an energizing circuit for the notching solenoid 102a between the positive and negative buses 71 and 73. The notching solenoid 102a responds by driving the notching pawl 100a to the left into its dotted line position of FIG. 6, charging the return spring 405 and positioning the driving portion of the pawl behind one of the ratchet teeth. The notching pawl 100 is maintained on its dotted line position until the contacts 262 of the gating relay open in response to termination of the overcurrent condition. When these contacts 262 open, the notching control relay 260 drops out to open its contacts 256, thus deenergizing the notching solenoid 102. When this happens, the then-charged return spring 405 is free to drive the notching pawl 100 from its dotted line position back to its solid line position, thus advancing the sequencing device 80 one step. It will be apparent that this one step advancement occurred in response to termination of the overcurrent and would occur whether the overload was terminated by the recloser itself or by some other means. It is to be understood that the solid line position of the pawl 100a is such that the pawl is out of engagement with the teeth of the ratchet wheel of the sequencing device 80, and this permits the sequencing device to reset to its normal-at-rest position (as explained in connection with FIG. 1) should the recloser remain closed for more than a predetermined time after any reclosing operation.

Although we have shown a recloser control system in which opening of the recloser is initiated in response to abnormally high phase currents in the power line 12, it will be apparent that, in its broader aspects, the invention is not limited to phase current sensitive systems. For example, as was mentioned hereinabove, the input signal to the tripping circuit could instead be derived from a conventional ground-fault sensitive network which is sensitive to unbalanced current in the different phases of a polyphase power system. When this unbalanced current exceeds a certain amount, enough signal voltage would be present to pick up the gating relay 45 of the recloser and to thus begin an opening operation in the same manner as described hereinabove.

While we have shown and described particular embodiments of our invention, it will be obvious to those skilled in the art that various changes and modifications may be made without departing from our invention in its broader aspects and we, therefore, intend in the appended claims to cover all such changes and modifications as fall within the true spirit and scope of our invention.

What we claim as new and desire to secure by Letters Patent of the United States is:

1. An automatic circuit recloser comprising a pair of separable contacts, means for opening said contacts in response to an abnormal current condition, means for automatically reclosing said contacts following an opening operation, normally-inactive time delay means operable when active to delay an opening operation of said recloser for a controlled period following initiation of an abnormal current condition, sequencing means responsive to operations of said recloser for rendering said time delay means active after a predetermined number of opening operations to delay the next succeeding opening operation in a series of closely-successive opening operations, and control means sensitive to an abnormal current condition of a duration insufficient to cause opening of said recloser for causing said sequencing means to render said time delay means active during the next abnormal current condition closely following termination of said abnormal current condition of insufficient duration, said control means being operable to render said time delay means active during said next abnormal current condition even when the line voltage at said recloser remains at a normal level.

2. The automatic recloser of claim 1 in which said sequencing means is advanced one step in response to an operation of said recloser or in response to termination of an abnormal current condition that is of insufficient duration to cause operation of said recloser, and in which the recloser includes means for resetting said sequencing means to a normal non-advanced position in response to advancement of said sequencing means through a predetermined number of steps, and means sensitive to the position of said recloser contacts for rendering said resetting means inoperative if said recloser is open while said sequencing means is in the position to which it has been advanced after advancement through said predetermined number of steps.

3. The automatic recloser of claim 1 in combination with means for rendering said control means ineffective upon entry of said sequencing means into a condition that renders said time delay means active, whereby said control means is ineffective to produce actuation of said sequencing means after said sequencing means enters said condition.

4. An automatic circuit recloser comprising a pair of separable contacts, means for opening said contacts in response to an overcurrent condition, means for automatically reclosing said contacts following an opening operation, normally-inactive time delay means operable when active to delay an opening operation of said recloser for a period following initiation of an overcurrent condition, sequencing means incrementally advanceable through a series of controlling positions in response to a series of closely successive recloser operations, means responsive to movement of said sequencing means into a predetermined controlling position for rendering said time delay means active to delay an opening operation of said recloser while said sequencing means is in said predetermined controlling position, and control means sensitive to an overcurrent condition of insufficient duration to cause opening of said recloser for advancing said sequencing means into said predetermined controlling position upon termination of a predetermined number of said insufficient duration overcurrent conditions, said predetermined number of insufficient duration overcurrent conditions being equal to the number of recloser operations that will cause said sequencing means to advance into said predetermined controlling position, said control means being operable to advance said sequencing means into said predetermined position even when the line voltage at said recloser remains at a normal level.

5. The automatic recloser of claim 4 in combination with means for resetting said sequencing means to a normal non-advanced position in response to said sequencing means being advanced through a predetermined number of steps, and means sensitive to the position of the recloser contacts for rendering said resetting means inoperative if said recloser is open while said sequencing means is in said position to which it has been advanced after said predetermined number of steps.

6. The automatic recloser of claim 4 in combination with means for rendering said control means ineffective to advance said sequencing means beyond said predetermined controlling position, said sequencing means continuing to be responsive to recloser operations so that closely successive recloser operations occurring after said sequencing means reaches said predetermined position continue to cause advancement of said sequencing means, and lockout means responsive to said continued advancement of said sequencing means for causing said recloser to remain open after a predetermined amount of said continued advancement.

7. The recloser of claim 4 in which said control means comprises energy storage means, means for causing energy to be stored in said energy storage means when an overcurrent condition occurs, and means for releasing said stored energy upon termination of said overcurrent condition, and in which said sequencing means comprises advancing means for advancing the sequencing means in response to release of said stored energy.

8. The recloser of claim 4 in combination with means for rendering said control means ineffective to advance said sequencing means for those overcurrent conditions that result in opening of said recloser, whereby said sequencing means advances only once for each of those overcurrent conditions that results in opening of said recloser.

9. An automatic circuit recloser comprising a pair of separable contacts, means for opening said contacts in response to an overcurrent condition, means for automatically closing said contacts following an opening operation, normally inactive time delay means operable when active to delay an opening operation of said recloser for a delay period following initiation of an overcurrent condition, sequencing means operable to render said time delay means active after said sequencing means is advanced through a predetermined number of steps, actuating means for said sequencing means for advancing said sequencing means a predetermined step each time said actuating means is operated, means for causing said actuating means to advance said sequencing means through a predetermined step for each opening operation of said recloser, energy storage means for storing energy to operate said actuating means, means for causing energy to be stored in said energy storage means in response to the occurrence of an overcurrent condition, and means responsive to termination of said overcurrent condition for transferring energy from said energy storage means to said actuating means to cause said actuating means to advance said sequencing means through a predetermined step upon termination of said overcurrent condition.

10. The recloser of claim 9 in combination with means for causing said actuating means to be operated only once for each of those overcurrent conditions that results in opening of said recloser so that said sequencing means advances only one step in response to each of those overcurrent conditions that results in opening of said recloser.

11. An automatic circuit recloser comprising a pair of separable contacts, means for opening said contacts in response to an overcurrent condition, means for automatically closing said contacts following an opening operation, normally inactive time delay means operable when active to delay an opening operation of said recloser for a delay period following initiation of an overcurrent condition, sequencing means operable to render said time delay means active after said sequencing means is advanced through a predetermined number of steps, actuating means for said sequencing means for advancing said sequencing means a predetermined step each time said actuating means receives an effective pulse of energy, means for delivering a first effective pulse of energy to said actuating means for each recloser-opening operation; auxiliary means for operating said actuating means comprising energy storage means for storing energy to operate said actuating means, means for causing energy to be stored in said energy storage means in response to the occurrence of an overcurrent condition, means responsive to the termination of an overcurrent condition of insufficient duration to cause opening of said recloser for supplying a second effective energy pulse from said energy storage means to said actuating means to cause said actuating means to advance said sequencing means through a predetermined step upon termination of said overcurrent condition while said recloser is closed; and means for causing said first and second energy pulses to be delivered to said actuating means substantially concurrently upon a recloser-opening operation so that said actuating means receives only a single effective pulse for a recloser-opening operation and thus advances the sequencing means through only one step for each of those overcurrents that causes opening of said recloser.

12. An automatic circuit recloser comprising a pair of separable contacts, means for opening said contacts in response to an overcurrent condition, means for automatically reclosing said contacts following an opening operation, normally inactive time delay means operable when active to delay an opening operation of said recloser for a period following initiation of an overcurrent condition, sequencing means operable in a step by step manner to render said time delay means active after advancement through a predetermined number of steps, actuating means for said sequencing means operable to advance said sequencing means through one step each time said actuating means is operated, a capacitor in circuit with said actuating means, means for causing energy to be stored in said capacitor in response to the occurrence of an overcurrent condition, and means responsive to termination of said overcurrent condition for discharging said capacitor through said actuating means to cause said actuating means to advance said sequencing means one step upon termination of said overcurrent condition.

13. The automatic recloser of claim 12 in combination with means for causing said actuating means to advance said sequencing means through only a single step for each opening operation of said recloser.

14. The recloser of claim 12 in which the means for opening said recloser comprises an electroresponsive trip device, said trip device being connected across the terminals of said capacitor in parallel with the actuating means for said sequencing means during discharge of said capacitor, said recloser further comprising a blocking rectifier connected in series with said trip device and in parallel with said actuating means considered in a circuit in which said capacitor is the power source, said rectifier being poled to block the flow of discharge current from said capacitor through said trip device for preventing operation of said trip device by said discharge current.

15. An automatic circuit recloser comprising a pair of separable contacts, means for opening said contacts in response to an overcurrent condition, means for automatically reclosing said contacts following an opening operation, normally inactive time delay means operable when active to delay an opening operation of said recloser for a period following initiation of an overcurrent condition, sequencing means operable to render said time delay means active after said sequencing means is advanced through a predetermined number of steps, means for producing advancement of said sequencing means through a predetermined step for each opening operation of said recloser and for cumulatively advancing said sequencing means in response to closely successive opening operations of said recloser, energy storage means, means for causing energy to be stored in said energy storing means in response to the occurrence of an overcurrent condition, and means responsive to the termination of said overcurrent condition for transferring energy from said energy storage means to said sequencing means to cause the sequencing means to advance through a predetermined step upon termination of said overcurrent condition, means for preventing appreciable energy from being stored in said energy storage means when said sequencing means has been advanced through said predetermined number of steps whereby said energy storage means becomes ineffective to supply the energy for further advancement of said sequencing means after advancement of said sequencing means through said predetermined number of steps, said sequencing means continuing to be responsive to opening operations of said recloser occurring after the sequencing means has been advanced through said predetermined number of steps so that continued advancement of said sequencing means occurs in response to additional opening operations of said recloser, and lock out means responsive to said continued advancement of said sequencing means for causing said recloser to remain open after a predetermined amount of said continued advancement.

16. An automatic circuit recloser comprising a pair of separable contacts, means for opening said contacts in response to an overcurrent condition, means for automatically closing said contacts following an opening operation, normally inactive time delay means operable when active to delay on opening operation of said recloser for a delay period following initiation of an overcurrent condition, sequencing means operable to render said time delay means active after said sequencing means is advanced through a predetermined number of steps, actuating means for said sequencing means for advancing said sequencing means a predetermined step each time said actuating means is operated, energy storage means for storing energy to operate said actuating means, means for causing energy to be stored in said energy storage means in response to the occurrence of an overcurrent condition, and means responsive to termination of said overcurrent condition for transferring energy from said energy storage means to said actuating means to cause said actuating means to advance said sequencing means through a predetermined step upon termination of said overcurrent condition.

17. The interrupter of claim 16 in which said energy storage means comprises a spring in which energy is stored in response to the occurrence of an overcurrent condition.

18. The interrupter of claim 16 in which said energy storage means comprises a capacitor in which electrical energy is stored in response to the occurrence of an overcurrent condition.

19. In a circuit sectionalizing device that comprises counting means advanceable through a predetermined number of steps to cause lockout of said sectionalizing device, actuating means for advancing said counting means in a step by step manner, a capacitor adapted to be connected in circuit with said actuating means, means for causing energy to be stored in said capacitor in response to the development of overcurrent conditions involving said sectionalizing device, electric switching means responsive to the termination of each such overcurrent condition for establishing a discharge circuit for said capacitor through said actuating means to enable the energy stored in said capacitor to be discharged through said actuating means for each termination of an overcurrent condition, said actuating means being responsive to the discharge of said stored energy therethrough to advance said counting means one step for each termination of an overcurrent condition.

20. A method of controlling an automatic circuit recloser that includes (1) means for opening the recloser in response to an overcurrent condition and (2) a sequencing device that can be advanced in a step-by-step manner to select which one of a plurality of time-current opening characteristics the recloser will operate on during a series of closely-successive overcurrent conditions, the method comprising: advancing said sequencing device one step for each opening operation of said recloser and advancing said sequencing device one step for each of said closely-successive overcurrent conditions that is terminated before it can cause opening of said recloser, said latter advancement being effected whether or not there is a drop in line voltage at said recloser and at a time when said overcurrent condition has been substantially terminated.

21. A method of controlling which of a plurality of time-current characteristics, one relatively quick and one relatively slow, a recloser will open with during an opening operation following termination of an overcurrent condition, comprising the steps of: changing from the relatively quick time-current characteristic to the relatively slow time-current characteristic if the recloser opens in response to said overcurrent condition and changing from said relatively quick time-current characteristic to said relatively slow time-current characteristic if the overcurrent condition should be terminated before said recloser can open, said latter change being effected whether or not there is a drop in line voltage at said recloser and at a time when said overcurrent condition has been substantially terminated.

22. In an electric power system that includes a first recloser relatively close to the system power source and a second recloser relatively remote from the system power source, the reclosers being adapted to open in response to overcurrent but being so coordinated that the remote recloser opens to interrupt overcurrent flowing through both reclosers before the closer recloser can operate, each recloser having a relatively quick and a relatively slow time-current opening characteristic and being set to operate in accordance with the relatively quick characteristic for a predetermined number of openings and in accordance with the relatively slow characteristic for closely-succeeding openings, the improvement comprising: control means for the closer recloser responsive to overcurrents that produce opening of the remote recloser but are of insufficient duration to open said closer recloser for causing said closer recloser to operate in accordance with said relatively slow time-current characteristic on the next overcurrent closely following a predetermined number of overcurrents through said closer recloser that result in opening of the remote recloser but not the closer recloser.

References Cited in the file of this patent

UNITED STATES PATENTS

| | | |
|---|---|---|
| 2,769,055 | Wallace et al. | Oct. 30, 1956 |
| 2,804,520 | Kyle et al. | Aug. 27, 1957 |
| 2,810,038 | Van Ryan et al. | Oct. 15, 1957 |
| 2,977,510 | Adamson et al. | Mar. 28, 1961 |
| 3,043,989 | Nash et al. | July 10, 1962 |